US 7,010,810 B2

(12) United States Patent
Ladwig

(10) Patent No.: US 7,010,810 B2
(45) Date of Patent: Mar. 7, 2006

(54) METHOD AND APPARATUS FOR PROVIDING A SOFTWARE AGENT AT A DESTINATION HOST

(75) Inventor: Michael Dennis Ladwig, Fairfax County, VA (US)

(73) Assignee: Litton Industries, Inc., Woodland Hills, CA (US)

( * ) Notice: Subject to any disclaimer, the term of this patent is extended or adjusted under 35 U.S.C. 154(b) by 847 days.

(21) Appl. No.: 09/821,668

(22) Filed: Mar. 29, 2001

(65) Prior Publication Data

US 2002/0144139 A1 Oct. 3, 2002

(51) Int. Cl.
*G06F 17/00* (2006.01)

(52) U.S. Cl. ............................. 726/29; 726/4; 726/30

(58) Field of Classification Search ........ 713/200–202, 713/150–154; 707/10, 104.1; 709/201–203; 719/311–320; 726/29, 30, 4
See application file for complete search history.

(56) References Cited

PUBLICATIONS http://www.javaworld.com/javaworld/jw-05-1997/jw-05-hood_p.html , written by Venners.*

Jaworski (Java 1.1 Developer's Guide Second Edition, 1997, pp. 90-95, 124-126, 139-140.*
http://www.javaworld.com/javaworld/jw-04-1998/jw-04-beans_p.html.*
Non-repudiation oblivious watermarking schema for secure digital video distribution; Zhou, W.; Rockwood, T.; Sagetong, P.; Multimedia Signal Processing, 2002 IEEE Workshop on Dec. 9-11, 2002 Page(s):343-346.*
Punishing manipulation attacks in mobile agent systems; Esparza, O.; Soriano, M.; Munoz, J.L.; Forne, J.; Global Telecommunications Conference, 2004. GLOBECOM '04. IEEE vol. 4, Nov. 29-Dec. 3, 2004 Page(s):2235-2239 vol. 4.*
A study on the system call for the protection of intellectual property rights on Linux base; Heun Kim; Dae-Joon Hwang; Dependable Computing, 2001. Proceedings. 2001 Pacific Rim International Symposium on Dec. 17-19, 2001 Page(s): 295-298.*

* cited by examiner

*Primary Examiner*—David Jung
(74) *Attorney, Agent, or Firm*—Patti & Brill, LLC

(57) ABSTRACT

An originating host (101) splits a software agent into a code unit (103) and a data unit (105) and forwards the data unit (105) to a destination host (107). Once the destination host (107) receives the data unit (105) from the originating host (101), the data unit (105) is combined with a code unit (109), associated with the data unit (105) but not sourced by the originating host (101), forming a destination agent. The destination agent is executed.

41 Claims, 3 Drawing Sheets

METHOD AND APPARATUS FOR PROVIDING A SOFTWARE AGENT AT A DESTINATION HOST

FIELD OF THE INVENTION

This invention relates to software mobility, including but not limited to a method and apparatus for providing a trusted software agent.

BACKGROUND OF THE INVENTION

Over the past few decades, numerous advances in computing technology have provided many advantages to society, such as the ability to word process more efficiently than with a typewriter, to communicate relatively inexpensively with a cellular phone, to hold videoconferences with people from anywhere in the world, and to shop for and purchase goods and services without leaving our homes via the internet.

Although many new abilities have been made possible by the latest computing technology, many other abilities are desirable, but not practical due to unresolved security/trust issues. For example, an engineer needs to obtain a part at a price under a fixed cost to meet a budget constraint, but has limited time to shop around for the part. If the engineer could send a software program, also known as an agent, that contains the specifications for the part, the cost, required ship date, shipping address, and a credit card number to one or more stores that are known to sell the part, and the store(s)' computer would execute that program and send the part, the engineer would meet all time, price, and specification requirements. Unfortunately, the engineer would not know trust that the agent would be intercepted and misused, including stealing the credit card number. Similarly, the stores would not completely trust any software program to be loaded on their computer for execution, as such a program could easily carry a virus or cause other undesirable problems.

Accordingly, there is a need for a method and apparatus to provide software agent mobility in a trusted manner.

SUMMARY

A method of the present invention comprises the steps of splitting, by an originating host, a software agent into a code unit and a data unit and forwarding the data unit to a destination host. Once the destination host receives the data unit from the originating host, the data unit is combined with a code unit that is associated with the data unit but not sourced by the originating host, thereby forming a destination agent. The destination agent is executed.

DESCRIPTION OF A PREFERRED EMBODIMENT

The following describes an apparatus for and method of providing software agent mobility in a trusted manner. A piece of mobile software called a software agent is split into an executable code unit and a non-executable data unit by an originating host. The data unit is forwarded to a destination host that obtains a code unit associated with the data unit, preferably not from the originating host. The combined code is then executed.

A method of the present invention comprises the steps of splitting, by an originating host, a software agent into a code unit and a data unit and forwarding the data unit to a destination host. Once the destination host receives the data unit from the originating host, the data unit is combined with a code unit that is associated with the data unit but not sourced by the originating host, thereby forming a destination agent. The destination agent is executed.

Optional steps include integrating, by the originating host, authentication results into the software agent prior to the splitting step. The destination host may verify the data unit by checking that the authentication results match authentication results sent with the data unit. The data unit may be non-executable. The destination host may obtain the code unit associated with the data unit from an external source, which may be authenticated prior to accepting the code unit associated with the data unit. The destination host may determine a level of risk acceptable for the code unit and select the external source based on the level of risk. The originating host may combine the data unit with a watermark prior to forwarding the data unit to the destination host, which removes the watermark from the data unit prior to the combining step. The destination host may prohibit the code unit of the originating host from being executed by the destination host. The results of the executing step may be forwarded to the originating host. A computer-readable signal bearing medium having computer readable program code may perform the steps of the method.

Figure 1:
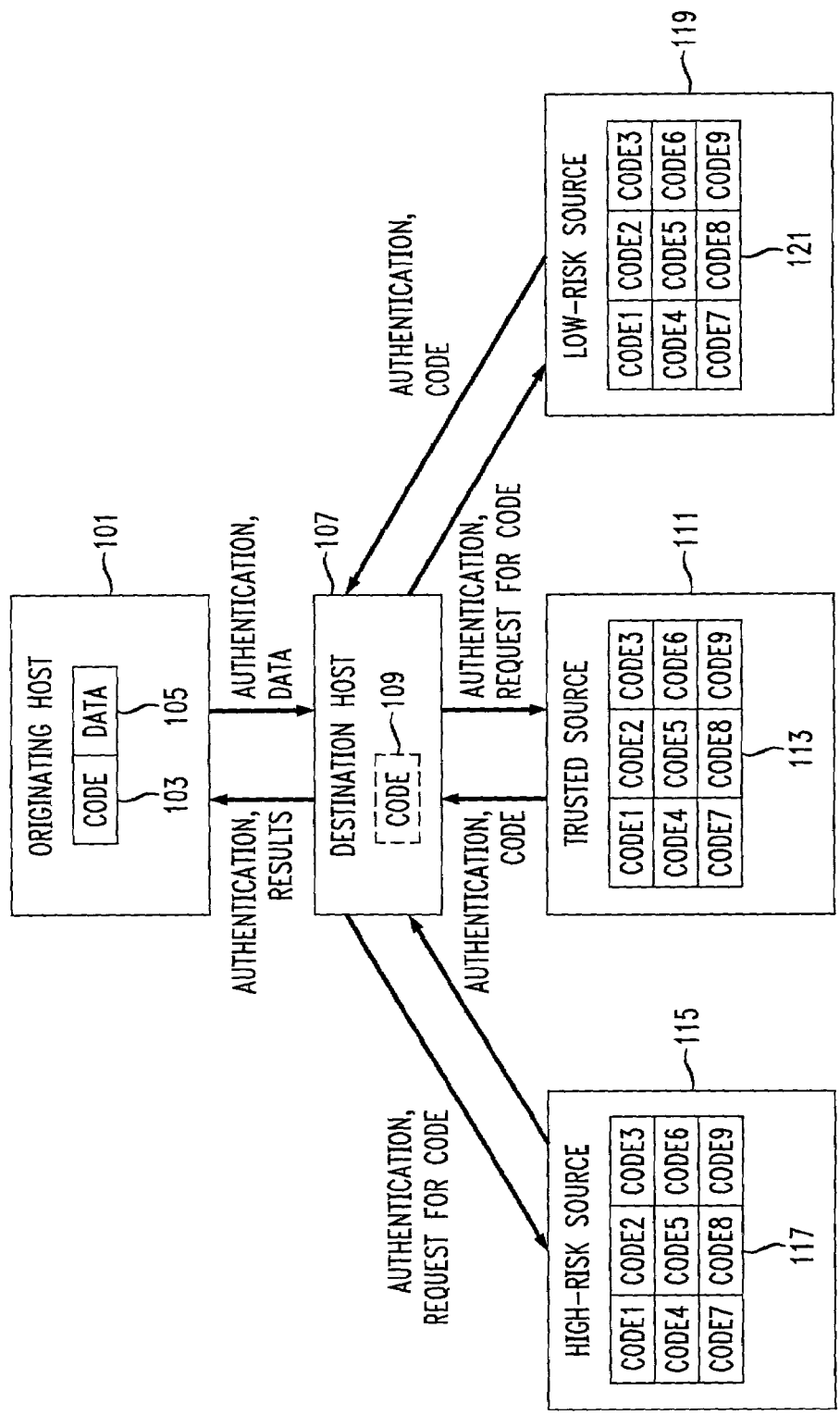
FIG. 1 is a block diagram of system in which agent mobility is practiced in accordance with the invention.

A block diagram of system in which agent mobility is practiced is shown in FIG. 1. An originating host 101, such as a computer server, personal computer (PC), cellular phone, smartcard, or other device having computing capabilities, stores numerous software programs and data, including a software agent that is an application or program that is intended to be executed at a destination host 107. The originating host 101 splits the software agent into a code unit 103 and a data unit 105 and forwards the data unit 105 to the destination host 107. The code unit 103 is preferably executable software that operates on the data unit 107 that is preferably non-executable.

The destination host 107 is, for example, a computer server, PC, cellular phone, smartcard, or other device having computing capabilities. The originating host 101 optionally authenticates the destination host 107 using an authentication process mutually agreed upon by the users of the originating host 101 and the destination host 107. Such processes include electronic signature, public key cryptography, SSL Secure Sockets Layer protocol, challenge and response encryption, biometric identification, such as fingerprint or retinal scan, and so forth. The originating host 101 sends appropriate authentication information to the destination host 107. The authentication process may require handshaking or other verification to prevent, for example, being intercepted by a "spoofed" location, in which case authentication information may also be sent from the destination host 107 to the originating host 101.

The destination host 107 receives the data unit 105 from the originating host 101 and determines which code unit 109 is associated with it. This determination may be accomplished in a number of ways. For example, the data unit 105 may include information that identifies an appropriate code unit 109. Another example is a stored table that matches data unit 105 identifications with code unit 103 identifications. The destination host 107 may have the appropriate code unit 109 stored in memory or may obtain the code unit from sources external to the destination host 107. One such external source is a trusted source 111 that includes one or more code units 113 that are downloadable upon request from the external source. Other external sources may be high-risk sources 115 that store one or more code units 117 and low-risk sources 121 that also store one or more code units 121. Requests for code, authentication information, and code may be exchanged with each of the external sources 111, 115, and 119. The destination host 107 may optionally authenticate the external source 111 115, or 119, for example, in the same way the originating host 101 authenticated the destination host 107.

Figure 2:
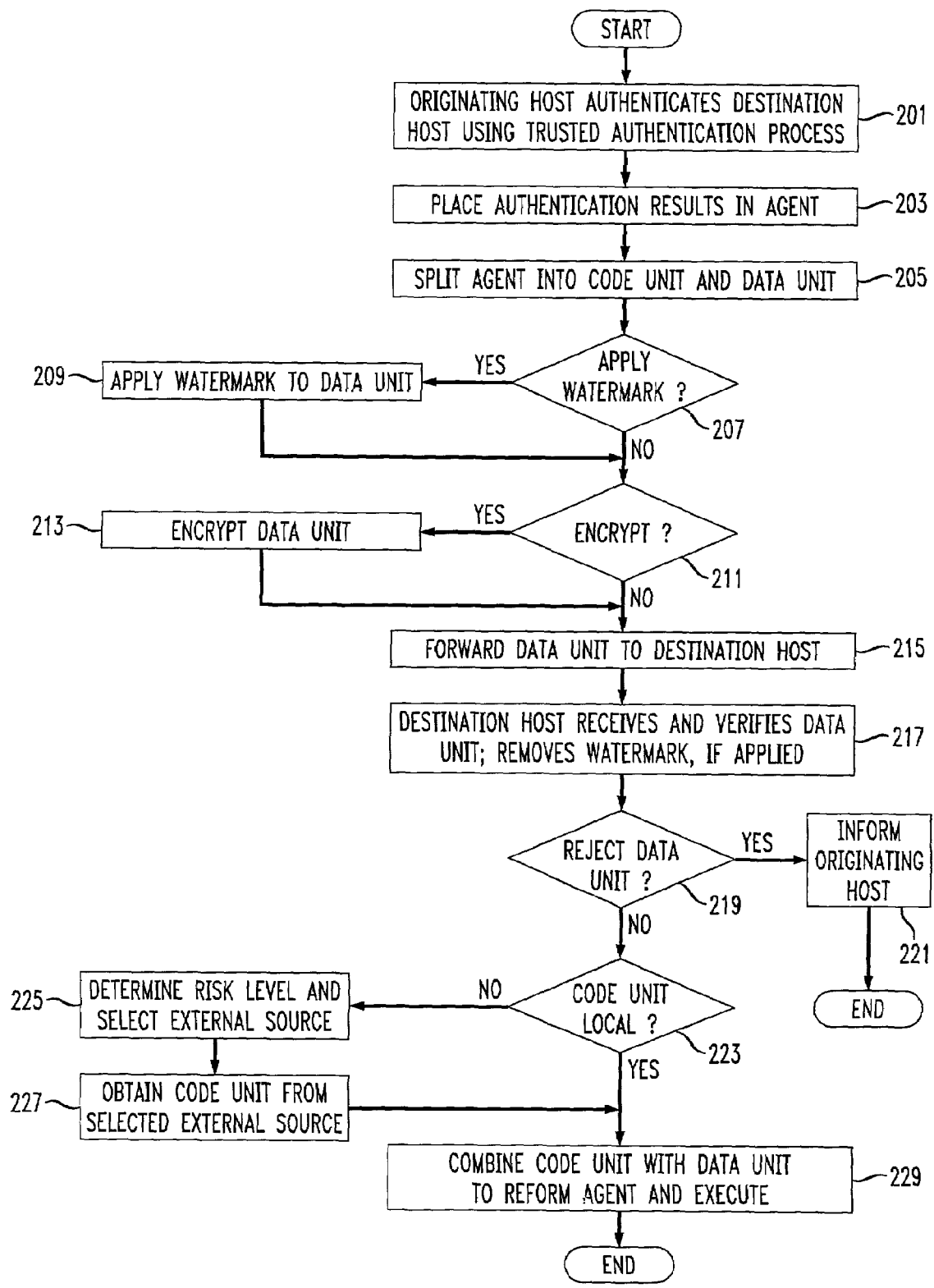
FIG. 2 is a flowchart showing a method of agent mobility in accordance with the invention.

A flowchart showing a method of agent mobility is illustrated in FIG. 2. At step 201, an optional step, the originating host 101 authenticates the destination host 107 using a trusted authentication process, such as described above. At step 203, an optional step, the originating host 101 places any authentication results from step 201 in the agent. At step 205, the originating host 101 splits the software agent into a code unit 103 and a data unit 105. At step 207, if it desired to apply a watermark to the data unit, a watermark is applied to the data unit 105 at step 209. A watermark is a fingerprinting type of process that may be applied to digital information in order to verify the identity of the sender. An example of a watermark process is described in U.S. Pat. No. 6,141,753, issued Oct. 31, 2000 to Zhao et al. and titled "Secure Distribution of Digital Representations," which describes a method of adding a watermark, particular to the user, to a digital representation and encrypting the result to allow the recipient to identify the user.

At step 211, it is determined whether or not the data unit 105 is to be encrypted prior to being forwarded to the destination host 107. When encryption of the data unit 105 is desired, the process continues with step 213, where the data unit 105 is encrypted. Public key encryption, private key encryption, and other secure encryption techniques may be used. For additional security, communications between the originating host 101 and the destination host 107 and between the destination host 107 and the external source 111, 115, 119, and 307 may be encrypted, such as with public key encryption or private key encryption. The process continues with step 215, where the originating host 101 forwards the data unit 105, via an appropriate communication link (wireline and/or wireless) to the destination host 107.

At step 217, the destination host 107 receives, decrypts if necessary, and verifies the data unit 105. In the preferred embodiment, the verification process includes checking that the authentication results from step 201 match authentication results sent with the data unit 105. Simpler verification techniques may also be utilized, such as DNS (Domain Name Server) lookup on the recipient's address from the message containing the data unit 105. At step 219, the destination host 107 has the option of rejecting the data unit 105. The data unit 105 may be rejected for a number of reasons, including the following examples. When authentication fails, such as when the authentication results from step 201 do not match the authentication results from step 201, the data unit 105 may be rejected. When removal of any applied watermark or encryption fails, the data unit 105 may be rejected. When the data unit 105 or associated code unit 103 exceed a specified size, the data unit 105 may be rejected. Various size limitations include storage capability of the destination host (especially in portable units with limited storage space, such as cellular phones), communication link capacity between the destination host and the code unit source 113, 117, or 121 (for example, low-capacity wireless), transfer time of the code unit 109 (for example, over low-speed internet connections), how far the code unit 109 may have to travel, and any other factors or combination of factors that may lead to failed execution of the agent.

At step 223, the destination unit 107 determines what code unit 109 is required, as described above, and determines whether the appropriate code unit 109 is stored locally at the destination host 107. When the code unit 109 is not stored at the destination host 107, the process continues with step 225, where the destination unit 107 determines a risk level and selects an external source for the code unit 109 based on that risk level. Typically, the risk level determination is a tradeoff between security, or risk to systems and/or data, and flexibility, how easily or quickly a code unit may be obtained. The risk level may be determined in a number of ways. The originating host 101 may include a risk level with the data unit 105 when it is sent, for example, associated with the execution privileges set forth by the software agent, as the code unit 103 requires. The destination host 107 may set a risk level based on the type of data unit 105 (extensive requirements such as financial or confidential versus less extensive requirements that are less substantial) or the identity and reputation of the originating host 101. For risk-free activity, the destination host accepts a code unit 109 from anywhere, including the originating host. When a low risk level is found, the destination host may load the code unit 105 from a less trusted source 119, such as a network server or even the originating host 101. When the risk level is determined to be at a medium level, the destination host 107 may only load the code unit 105 from a medium risk source, such as an encrypted network server. When a high risk level is found, the destination host 107 may only load the code unit 105 from a local, trusted read only media 115, such as a serial-number protected CD-ROM. When the risk level is determined to be trusted source 111 only, the destination host 107 may only load the code unit 105 from a trusted source 111, such as a secure server. Other variations of risk levels may also be assessed.

At step 227, the code unit 223 is obtained from the external source selected at step 225. After either step 223 or 227, the process continues with step 229, where the code unit 109 (either stored locally or from the external source), is combined with the data unit 105 to reform the software agent, which is then executed. The results of the execution process may optionally be sent back to the originating host 101.

Figure 3:
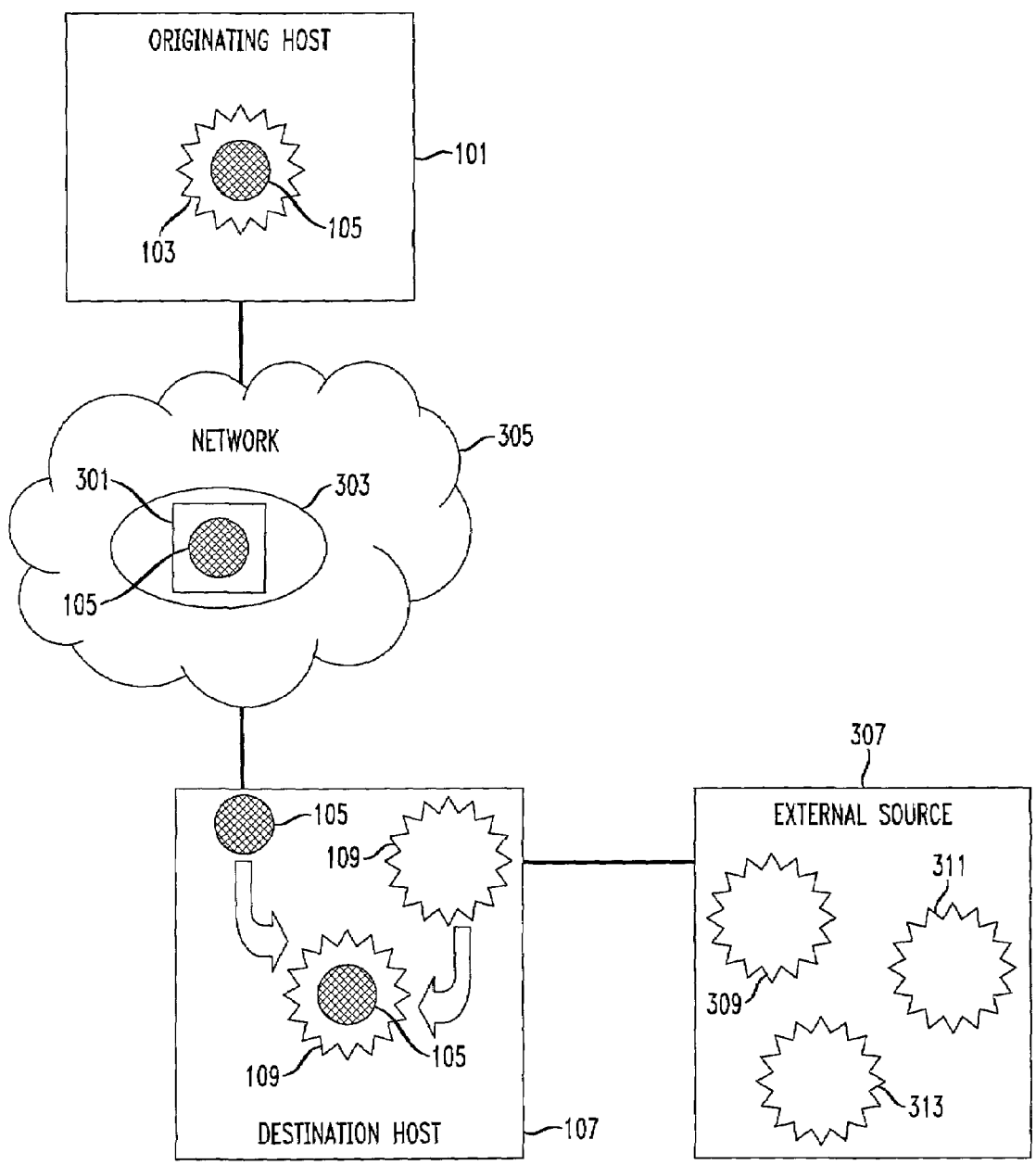
FIG. 3 is a block diagram showing progress of a code unit and a data unit from an originating host to a destination host in accordance with the invention.

A block diagram showing progress of a code unit and a data unit from an originating host 101 to a destination host 107 is shown in FIG. 3. The software agent is shown as a code unit 103 and a data unit 105 at the originating host 101. The originating host 101 splits the software agent into the code unit 103 and the data unit 105, and processes the data unit 105 accordingly. Authentication information may be added to the data unit 105, a watermark 301 may be combined with the data unit 105, and encryption 305 may be provided prior to forwarding the data unit 105 via a computer network 305, such as a local-area network, a wide-area network (e.g., the internet), or a wireless network, including private and public networks, to the destination host 107. The destination host 107 strips off any encryption 303 and/or watermark 301. The destination host 107 obtains a code unit 109 associated with the data unit 105. The code unit 109 may be stored at the destination host 107 or may come from an external source 307 (any of 111, 115, or 119 described above), such as a CD ROM, secure server, and/or read only memory that stores one or more code units 309, 311, and 313.

The present invention provides a method an apparatus for moving a piece of mobile software in the form of a software agent from one computing source to another in a secure and trusted manner. Because the destination host is able to prohibit the code unit from the originating host from being executed at the destination host, the destination host is able to prevent viruses and other undesirable software from executing it. The present invention provides an efficient way to perform a search or other time-consuming data lookup because the searching device (the agent) is local to the data source. For example, if a person had a 56 k modem over which to perform a search, it would take a significant amount of time to receive search results and to pare them down, whereas sending an agent to the data source allows the search to take place at much higher rates because the source and search engine are both local. Because the data unit is much smaller than the code unit, the data unit takes less time and bandwidth to send, thus the applications for the present invention are vast, for example, in wireless communication devices such as cellular phones, two-way pagers, and smartcards. Similarly, devices with limited processing capability, such as smaller PCs, cellular phones, and other portable devices with computing capability, may be able to obtain more processing capability externally by utilizing the present invention. The present invention provides for the use of mobile agents in a distributed network without requiring regular software code updates of the various nodes in the distributed network. As long as a destination host is able to utilize a code source with a sufficient degree of trust/security, the origination agents may be flexible with what types of agents are executed at the destination host.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
generating a software agent at an origination host;
splitting the software agent into a code unit and a data unit;
forwarding from the originating host the data unit but not the code unit to a destination host; and
combining, by the destination host, the data unit with a further code unit associated with the data unit, forming a destination agent, wherein the further code unit is not sourced by the originating host.

2. The method of claim 1, further comprising the steps of authenticating the destination host, yielding authentication results, and integrating the authentication results into the software agent.

3. The method of claim 1, wherein the data unit is non-executable.

4. The method of claim 1, further comprising the step of combining the data unit with a watermark prior to forwarding the data unit to the destination host.

5. The method of claim 1, further comprising the step of encrypting the data unit prior to forwarding the data unit to the destination host.

6. A computer-readable signal bearing medium having computer readable program code that performs the steps of claim 1.

7. A method comprising the steps of:
receiving a data unit at a destination host from an originating host;
verifying the data unit;
combining at the destination host the data unit with a code unit, forming a software agent, the code unit not being received from the originating host;
executing the software agent.

8. The method of claim 7, further comprising the step of authenticating the originating host, yielding authentication results.

9. The method of claim 7, wherein the step of verifying comprises the step of checking that the authentication results match authentication results sent with the data unit.

10. The method of claim 7, further comprising the step of obtaining the code unit from an external source.

11. The method of claim 10, further comprising the step of determining a level of risk acceptable for the code unit and selecting the external source based on the level of risk.

12. The method of claim 10, further comprising the step of authenticating the external source prior to accepting the code unit.

13. The method of claim 7, further comprising the step of forwarding results of the executing step to the originating host.

14. The method of claim 7, further comprising the step of decrypting the data unit.

15. The method of claim 7, further comprising the step of removing a watermark from the data unit.

16. The method of claim 7, further comprising the step of prohibiting a code unit of the originating host from being executed by the destination host.

17. The method of claim 7, further comprising the step of rejecting the data unit and inhibiting the combining and executing steps.

18. A computer-readable signal bearing medium having computer readable program code that performs the steps of claim 7.

19. A method comprising the steps of:
splitting, by an originating host, a software agent into a code unit and a data unit;
forwarding the data unit to a destination host;
receiving, by the destination host, the data unit from the originating host;
combining, by the destination host, the data unit with a code unit associated with the data unit, forming a destination agent, wherein the code unit is not sourced by the originating host;
executing the destination agent.

20. The method of claim 19, further comprising the step of integrating, by the originating host, authentication results into the software agent prior to the splitting step.

21. The method of claim 19, wherein the data unit is non-executable.

22. The method of claim 19, further comprising the step of verifying, by the destination host, the data unit.

23. The method of claim 22, wherein the step of verifying comprises the step of checking that the authentication results match authentication results sent with the data unit.

24. The method of claim 19, further comprising the step of obtaining, by the destination host, the code unit associated with the data unit from an external source.

25. The method of claim 24, further comprising the step of determining a level of risk acceptable for the code unit and selecting the external source based on the level of risk.

26. The method of claim 24, further comprising the step of authenticating the external source prior to accepting the code unit associated with the data unit.

27. The method of claim 19, further comprising the steps of combining the data unit with a watermark prior to forwarding the data unit to the destination host and removing, by the destination host, the watermark from the data unit prior to the combining step.

28. The method of claim 19, further comprising the steps of encrypting the data unit prior to forwarding the data unit to the destination host and decrypting, by the destination host, the data unit prior to the combining step.

29. The method of claim 19, further comprising the step of prohibiting the code unit of the originating host from being executed by the destination host.

30. The method of claim 19, further comprising the step of forwarding results of the executing step to the originating host.

31. The method of claim 19, further comprising the step of rejecting the data unit and inhibiting the combining and executing steps.

32. A computer-readable signal bearing medium having computer readable program code that performs the steps of claim 19.

33. A system comprising:
an originating host, arranged and constructed to split a software agent into a code unit and a data unit and forward the data unit but not the code unit associated with the data unit to a destination host;
a destination host, arranged and constructed to receive the data unit, to combine the data unit with a code unit associated with the data unit, thereby forming a destination agent, wherein the code unit is not sourced by the originating host.

34. The system of claim 33, wherein the originating host and destination host are further arranged and constructed to complete an authentication process, yielding authentication results that are integrated into the software agent prior to the splitting step.

35. The system of claim 34, wherein the destination host is further arranged and constructed to verify the data unit by checking that the authentication results match authentication results sent with the data unit.

36. The system of claim 33, wherein the data unit is non-executable.

37. The system of claim 33, wherein the destination host is further arranged and constructed to obtain the code unit associated with the data unit from an external source.

38. The system of claim 37, wherein the destination host is further arranged and constructed to determine a level of risk acceptable for the code unit and select the external source based on the level of risk.

39. The system of claim 33, wherein the originating host is further arranged and constructed to combine the data unit with a watermark prior to forwarding the data unit to the destination host, and wherein the destination host is further arranged and constructed to remove the watermark from the data unit prior to the combining step.

40. The system of claim 33, wherein the originating host is further arranged and constructed to encrypt the data unit prior to forwarding the data unit to the destination host, and wherein the destination host is further arranged and constructed to decrypt the data unit prior to the combining step.

41. The system of claim 33, wherein the destination host is further arranged and constructed to prohibit the code unit of the originating host from being executed by the destination host.

* * * * *